United States Patent [19]

Goergen et al.

[11] Patent Number: 5,085,259
[45] Date of Patent: Feb. 4, 1992

[54] TIRE TREAD

[75] Inventors: René Goergen, Colmar-Berg; Pierre Kummer, Bereldange, both of Luxembourg

[73] Assignee: The Goodyear Tire & Rubber Company, Akron, Ohio

[21] Appl. No.: 552,735

[22] Filed: Jul. 16, 1990

[51] Int. Cl.$^5$ .............................................. B60C 11/03
[52] U.S. Cl. ................................................ 152/209 R
[58] Field of Search .......... 152/209 R, 209 D, DIG. 3

[56] References Cited

U.S. PATENT DOCUMENTS

| D. 263,578 | 3/1982 | Nyblom ........................... 7/70 |
| D. 283,609 | 4/1986 | Kawabata et al. ............. 12/147 |
| D. 308,503 | 6/1990 | Goergen et al. ............... 12/146 |
| 2,708,957 | 5/1955 | Constantakis et al. ....... 152/DIG. 3 |
| 4,383,568 | 5/1983 | Pieper ........................ 152/209 R |
| 4,823,855 | 4/1989 | Goergen et al. ............. 152/209 R |
| 4,934,424 | 6/1990 | Kojima ........................ 152/DIG. 3 |

FOREIGN PATENT DOCUMENTS

| 0112533 | 12/1983 | European Pat. Off. . |
| 2-91191 | 5/1986 | Japan . |
| 993438 | 4/1980 | United Kingdom . |
| 0980590 | 7/1982 | United Kingdom ........... 152/209 D |
| 1006180 | 1/1983 | United Kingdom . |

OTHER PUBLICATIONS

Advertisement Oct. 1985, Issue of "Gummi Bereifung" for NR09 Tire.
U.S. Appln. 07/552,734 Filed 7/16/90 fo "Tread for a Pneumatic Tire", Goergen et al.

Primary Examiner—Michael W. Ball
Assistant Examiner—N. Krowezyk
Attorney, Agent, or Firm—David L. King; Lonnie R. Drayer

[57] ABSTRACT

A tire tread (11) comprises first and second straight grooves (30, 31) which extend circumferentially about the tire, one of said straight grooves being disposed on either side of the equatorial plane (EP) of the tire and delimiting a central portion and two shoulder portions. A plurality of laterally extending zig-zag grooves (32, 37; 33, 34) on either side of the equatorial plane each comprises two sets of legs, a first set of three legs (32A, 32B, 32C) extending across the shoulder portion and a second set of two legs (32D, 32E) extending into the central portion, the first and second sets of legs being circumferentially offset by said straight circumferential groove. The lateral sides of the fifth leg (34E) of each laterally extending zig-zag groove nearest to the equatorial plane (EP) continue towards the equatorial plane via narrow grooves which merge each into one of the two narrow grooves extending from the fifth leg of a laterally extending zig-zag groove situated on the opposite side of the equatorial plane. The circumferential and lateral grooves cooperating to define rows (50, 51) of interpenetrating blocks.

13 Claims, 4 Drawing Sheets

TIRE TREAD

The present invention relates generally to tire treads, and more specifically to treads for pneumatic tires intended for use both on and off paved surfaces.

A class of motor vehicles gaining in popularity every day are those which can be used for commuting over paved highways and for recreational use in off highway situations. Such vehicles often take the form of pick-up trucks or small general purpose vehicles. It is quite common for such on/off road vehicles to have four wheel drive capability. Such vehicles present a special challenge to a tire engineer because the performance characteristics desired for highway use are trade offs with the performance requirements for off road use. Examples of such trade offs are: mud traction versus tread wear, off road handling versus on road handling; and, wet traction versus dry traction. Furthermore, when an on/off road all purpose vehicle is used for commuting about town, it is seldom loaded to its full weight capacity, whereas when the same vehicle is packed with recreational equipment for off road use, the tires are subjected to much greater load.

A tire tread having the capacity to provide adequate wear, mud traction, sand traction, on road handling, off road handling, wet traction and dry traction when used with small general purpose motor vehicles and trucks is known from commonly owned U.S. Pat. No. 4,823,855. The tread has a directional pattern, a higher net to gross ratio in the tread center than towards the shoulder portions and a variation in stiffness between the different block elements.

It is an aim of the present invention to provide a tire tread, which has better performance than the tire tread described in the above application.

It is a further aim of the present invention to provide a tire tread which is not directional.

These aims are met by a tread as described in the appended claims.

The advantages which have been gained over the tire tread taught in U.S. Pat. No. 4,823,855 are an overall lower noise generation and better traction properties on muddy as well as on sandy soils, improved handling and a better mileage. The manufacturing and storage costs for a tire company are reduced because inasmuch as the design is not directional it is not required to have two different types of tires, but a single type is sufficient to equip a vehicle. This requirement of having two different types of directional tires does, however, not stem from the directional design itself, but from the white lettering on the sidewalls of four wheel drive general purpose vehicles, which lettering is generally provided on only one side of a tire. Furthermore a tire having a directional tread design, once fitted on its rim, rotates in the required direction on one side of the vehicle only; consequently utmost care must be taken when mounting the tires on a vehicle.

To acquaint persons skilled in the art most closely related to the instant invention, certain preferred embodiments are now described with reference to the annexed drawings. These embodiments are illustrative and can be modified in numerous ways within the spirit and scope of the invention defined in the claims.

As used herein and in the claims, the terms "radial" and "radially" are understood to refer to directions that are perpendicular to the axis of rotation of a tire, the terms "axial" and "axially" are understood herein to refer to directions that are parallel to the axis of rotation of a tire and the terms "lateral" and "laterally" are understood to refer to directions going from one sidewall of a tire towards the other sidewall of the same tire. "Tread width" TW is understood to refer to the greatest axial distance across the tread, when measured from a footprint of the tire, when the tire is subjected to its design load and when inflated to its design pressure for said load. An equatorial plane EP is understood to refer to a plane which is perpendicular to the tire's axis of rotation and passing through the center of its tread.

A tire in accordance with the present invention has an aspect ratio SH/SD in the range of 0.60 to 1, preferably in the range of 0.70 to 1. For example, a tire of size 7.50 R 16 has a section width SD of about 210 mm and an aspect ratio of about 0.94. "Section height" SH refers to the radial distance from the nominal rim diameter to the greatest outer diameter of the tire; "section width" SD means the maximum linear distance parallel to the axis of rotation of the tire between the exteriors of its sidewalls, exclusive of indicia or ornamentation on the sidewalls.

The present invention is explained by reference to a tread integral with a tire and all of the tire and tread dimensions used herein and in the claims are understood to refer to a tread on a tire having been mounted on its specified rim and inflated to its specified inflation pressure while not being subject to any load. It is however to be understood, that the invention applies to new tires, to retreaded tires, as well as to strips of treads being at least partly vulcanized and having a pattern of grooves and raised elements integral therewith.

Figure 1:
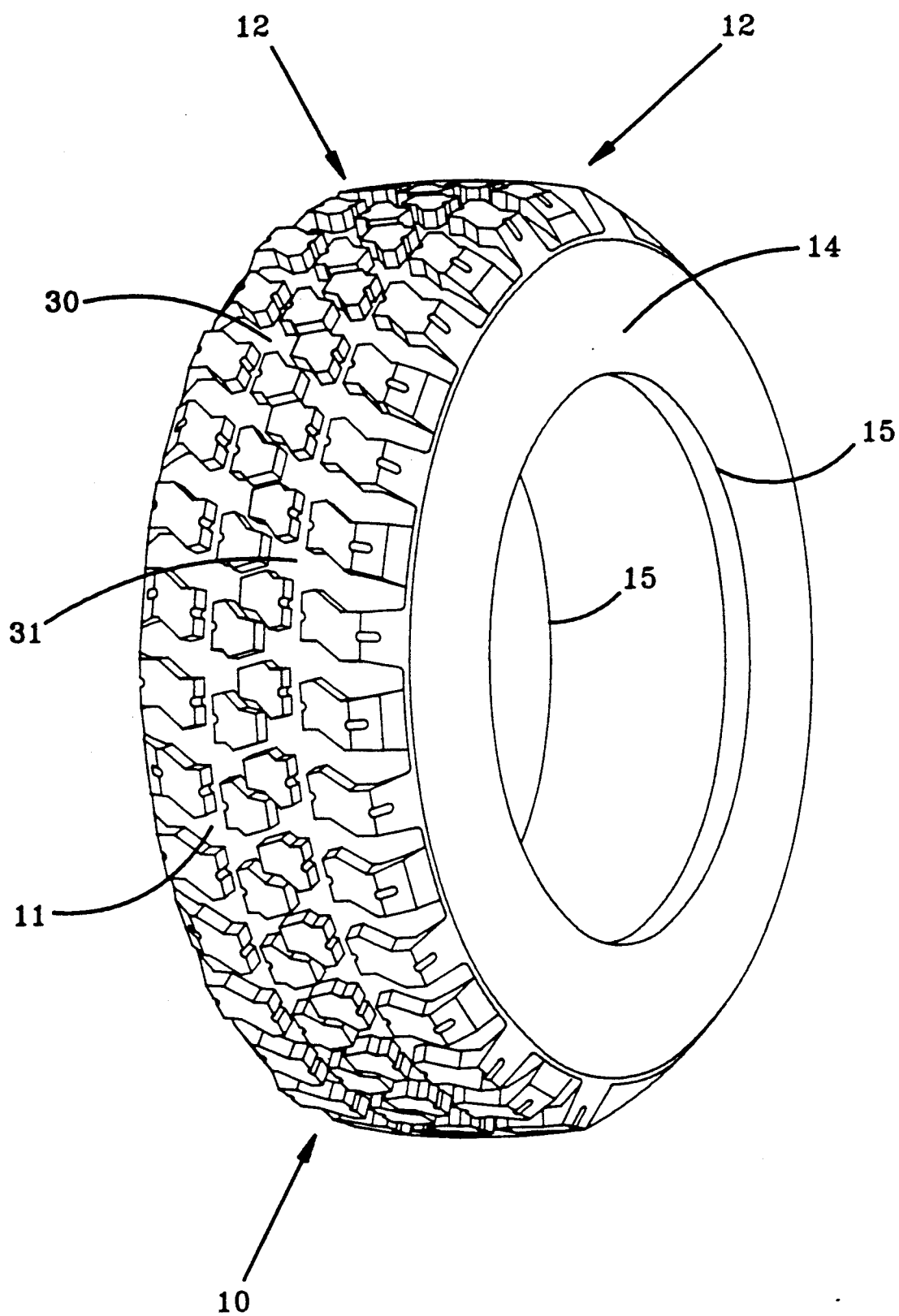
FIG. 1 is a perspective view of a tire provided with a tread according to the preferred embodiment of the invention.
Figure 3:
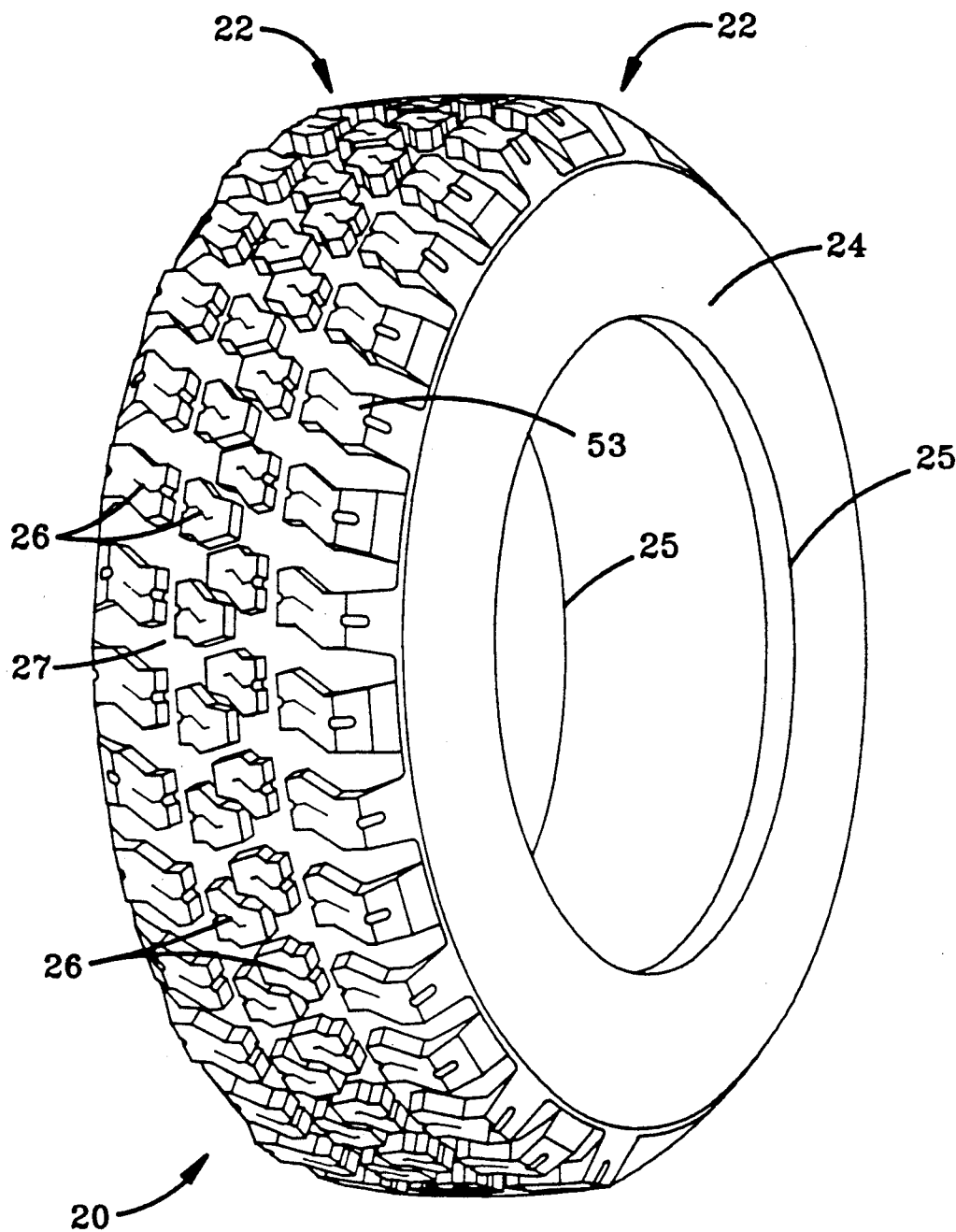
FIGS. 3 and 4 are a perspective view and an enlarged fragmentary view, respectively, of a tread portion according to another embodiment of the invention.

With reference to FIGS. 1 and 3 there are illustrated motor vehicle pneumatic tires 10 and 20, preferably of the radial carcass type, having respectively ground contacting treads 11 and 21. The treads each are flanked by a pair of shoulders, 12, 22, through which they are joined to a pair of sidewalls 14, 24, that extend radially inwardly from the tread and each terminate in a bead 15, 25.

Figure 2:
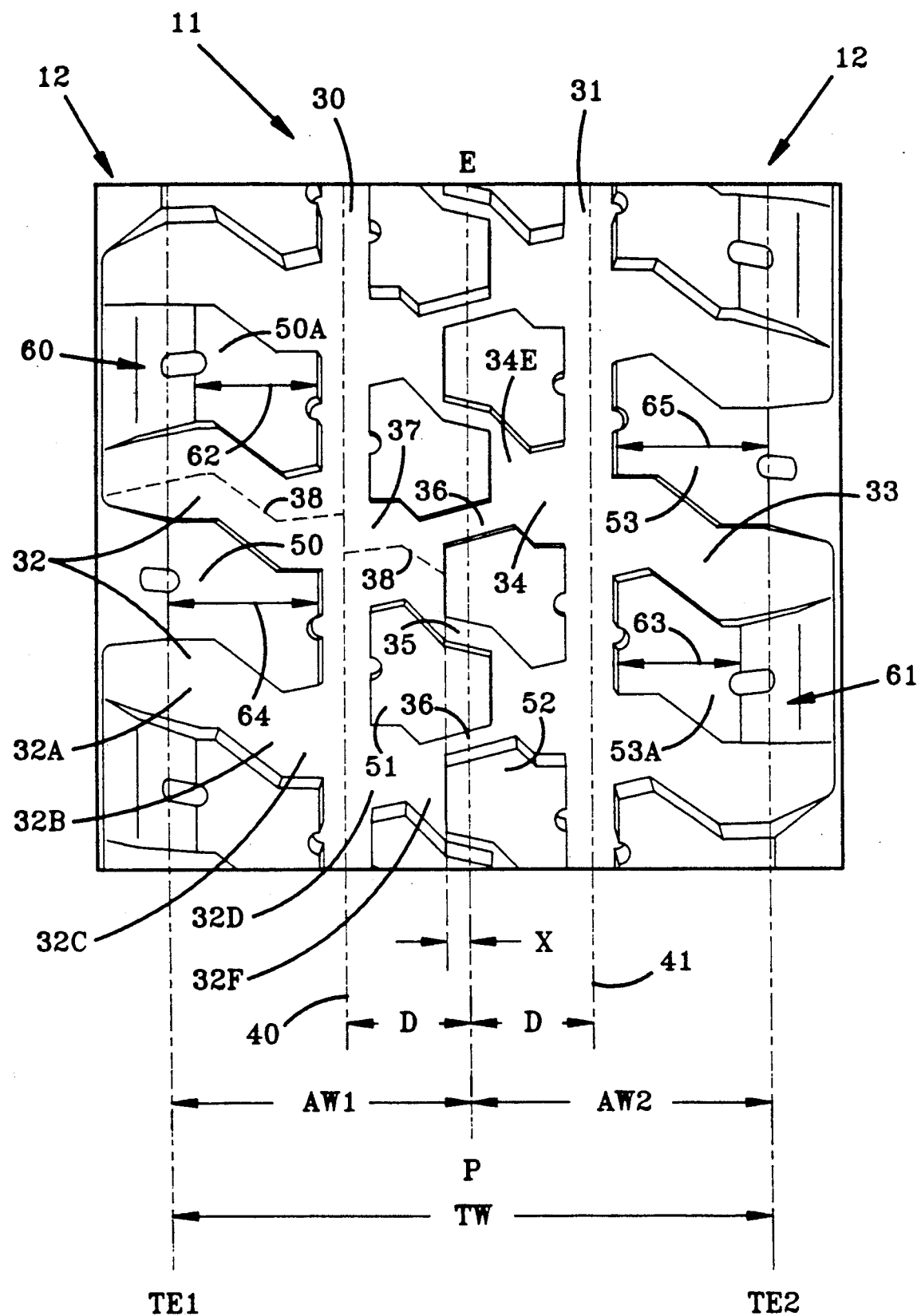
FIG. 2 is an enlarged fragmentary view of a portion of the tread of the tire shown in FIG. 1, looking towards the axis of rotation of the tire.

Referring now more specifically to FIG. 2 representing an enlarged fragmentary view of the tread of the tire shown in FIG. 1, a set of grooves 30-37 cooperate with one another to divide the tread into lands 50-53, 50A, 53A. As used herein and in the claims "groove" is understood to mean an elongated void area in a tread that may extend circumferentially about or laterally across the tread in a straight, curved or zig-zag manner. The circumferentially and the laterally extending grooves have common portions where they intersect with one another. The grooves are subclassified as "wide", "narrow" or "sipe". As used herein and in the claims a "wide" groove (see for instance grooves 30-33) has a width greater than 5% of the tread width TW whereas a "narrow" groove (see for instance grooves 35 and 36) has a width in the range from about 0.8% to 5% of the tread width TW. As used herein and in the claims a "sipe" (see reference 26 in FIG. 4) is a groove having a width in the range from about 0.2% to 0.8% of the tread width TW. Sipes are typically formed by steel blades inserted into a cast or machined mold; as they are so narrow, they are illustrated by single lines.

The tread 11 of a tire according to the invention has first and second straight and wide grooves 30, 31 therein which extend circumferentially around the tire. As used herein and in the claims, a circumferentially extending "straight groove" is understood to refer to any groove for which the groove edges at the outer surface of the tread are disposed such that a plane parallel to the equatorial plane EP could be located between the groove edges, without intersecting any edge of the groove at any point around the circumference of the tire. That is to say the groove edges do not need to be parallel to one another in order to be a straight groove. In the preferred embodiment both of said first and second straight grooves 30 and 31 have centerlines 40 and 41 that follow paths which ar parallel to the equatorial plane EP.

One of said straight circumferentially extending grooves 30, 31 is disposed on each side of the equatorial plane EP of the tire and is spaced from said plane by a distance, as indicated at D, in the range of 16% to 24% of the tread width TW. The width of the straight circumferential grooves 30 and 31 is preferably in the range of 6% to 10%, and most preferably in the range of 7% to 9%, of the tread width TW. All of the groove widths are measured perpendicular to the direction of the groove at the point of measurement.

A plurality of wide zig-zag grooves 32, 37 and 33, 34 cooperate to extend laterally across the tread 11 from the respective tread edges TE1 and TE2 towards the equatorial plane EP. The width of these wide zig-zag grooves ranges between 8% and 16%, and is preferably about 12%, of the tread width TW. The lateral grooves 32 and 33 each have three legs, and the lateral grooves 34 and 37 each have two legs. A set of lateral grooves extends circumferentially about the tire in a repetitive manner, the widths of the lateral grooves depending on the pitch length variation, as is practiced in the industry for tire noise reduction. By pitch length is meant the design cycle length of the repetitive tread pattern elements. In a preferred embodiment a laterally extending zig-zag groove 32, 37 on one side of the equatorial plane has a centerline 38 which follows a path such that the first leg 32A intersects the tread edge TE1 and the third leg 32C and fourth leg 37D, intersect the circumferentially extending groove 30, to form with the equatorial plane EP an angle comprised between 80° and 90°. The third and fourth legs 32C, 37D of the lateral grooves on both sides of the circumferentially extending groove 30 are circumferentially offset by less than half, and preferably by about 18%, of the distance between the centerlines of adjacent lateral grooves. The centerlines of the adjacent second leg 32B and fifth leg 37E form angles respectively comprised between 50° and 60° and between 45° and 55° respectively with the equatorial plane EP of the tire.

The lateral sides of the fifth legs 37E of the lateral zig-zag grooves, which are the legs nearest to the equatorial plane EP, extend towards the equatorial plane by means of narrow grooves 35,36 which each merge into one of the two narrow grooves extending from the fifth leg 34E of the zig-zag groove 33, 34 situated on the opposite side of the equatorial plane. Each laterally extending wide zig-zag groove 32, 37 on one side of the equatorial plane is thereby interconnected, through two circumferentially spaced narrow grooves 35, 36 intersecting the equatorial plane, to the two neighboring laterally extending wide zig-zag grooves 33, 34 situated on the opposite side of the equatorial plane. The circumferentially spaced narrow laterally extending grooves have a preferred width ranging between 2% and 5% of the tread width TW and more preferably of about 3% of the tread width.

The laterally extending centermost wide groove portions 34, 37 and narrow grooves 35, 36 cooperate with the circumferentially extending grooves 30 and 31 to define land portions 51 and 52 arranged respectively in two circumferentially extending block rows. Each block extends axially towards the opposite tread edge part of the equatorial plane by a distance X of at least 3% of the tread width TW, so that there is an interpenetration, that is to say axial overlapping, of the block rows. Put another way, for each of the land portions 51,52 of the two block rows, about 10% to 30 % of the axial width of each block is on one side of the equatorial plane, and about 70% to 90% of the axial width of each block is on the opposite side of the equatorial plane.

The lateral grooves 33, 34 on the opposite side of the equatorial plane are similar to those described above, but extend in the opposite circumferential direction. They are circumferentially offset by less than half the distance between the centerlines of adjacent lateral grooves. The number of laterally extending grooves in the circumferentially extending set of lateral grooves is preferably in the range of thirty-six to seventy, with the exact number depending upon the size of the tire. For example a tire of size 7.50 R 16 has about 54 zig-zag grooves extending laterally thereacross.

The grooves are arranged on the tread so that in a footprint of the tire, on either side of the equatorial plane, the ratio of the area of the grooves to the total footprint area of the tread is substantially equal and ranges between 40% and 60%. The ratio of land area to total footprint area in the center portion of the tread, i.e. the portion of the tread located between two planes spaced by a distance D from either side of the equatorial plane and parallel thereto, ranges between 50% and 70%, and more preferably between 55% and 65%, whereas the ratio of land area to total footprint area on the remaining portion of the tread ranges between 40% and 65%, and more preferably between 45% and 55%. It is believed that the good performance characteristics of the tire, having especially regard to the mileage are attributable at least in part to the high land density in the center of the tread. For example, a tire of size 7.50R16 has a ratio of land area to total footprint area of about 50%, the ratio of land area to total footprint area in the center portion located between the planes spaced by the distance D being about 54%.

Mainly for appearance reasons, the laterally outermost parts of the wide zig-zag grooves 32, 33 are extended past the tread edges TE1, TE2 towards the respective sidewall 14. Every other, that is to say circumferentially alternating, axially outermost land portion is provided with an axial offset 60, 61 defining respective narrow land portions 50A, 53A having an axial extent 62, 63 between 70% and 90% of the axial extent 64, 65 of the wide land portions 50, 53. As a result of this preferred embodiment, the leading edges of the wide land portions 50, 53 near the tread edges TE1, TE2 can exert extra traction when the tire is operated in mud or sand.

Figure 4:
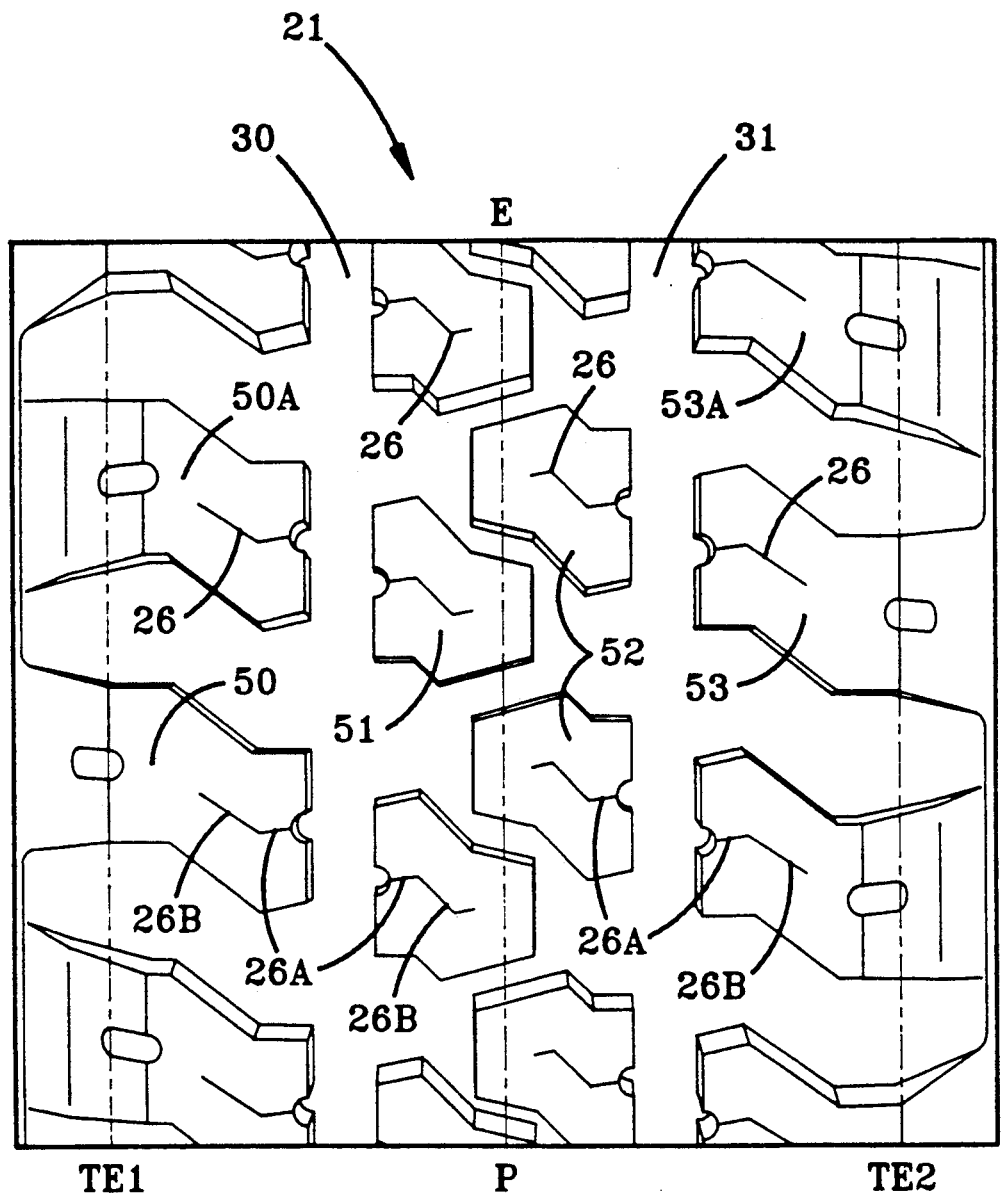

In the particular embodiment of the invention illustrated in FIGS. 3 and 4, a plurality of sipes 26 are provided in the land portions 50–53 in order to improve the winter grip of the tire. It is preferred that each land portion includes a single sipe, originating in a circumferentially extending groove 30, 31, substantially halfway between the leading and trailing edges of the land portion. The sipes follow substantially the path of the centerline of the land portion but do not extend to the opposite peripheral edge of the land portion, so as to maintain excellent handling and wear characteristics. These sipes are of conventional construction and are well known to those skilled in the art. Generally, the sipes have a depth ranging between 20% and 60% of the depth of the circumferential and lateral grooves. In a preferred embodiment the sipes have a depth of about 50% of the tread depth towards the circumferentially extending grooves 30, 31 and of about 20% towards the interior of the land portion; put in other words, the portion 26A of the sipe nearest to the grooves 30, 31 has a depth of about 7 mm, the portion 26B of the sipe nearest to the center of the land portion has a depth of about 3 mm, the tread depth of the (new) tire being of about 14 mm. The transition between the deep portion 26A and the shallow portion 26B of the sipe is steplike and located about halfway of the lateral extent of the sipe.

While certain representative embodiments have been described for the purpose of illustrating the invention, it will be apparent to those skilled in the art that various changes and modifications may be made therein without departing from the spirit or scope of the invention.

We claim:

1. A tire tread comprising an elastomeric substance, extending circumferentially about the axis of rotation of a tire and having a pair of lateral edges, and an equatorial plane centered between the lateral edges and perpendicular to the axis of rotation of the tire, said tread having first and second straight grooves therein which extend circumferentially about the tire, one of said straight grooves being disposed on either side of the equatorial plane of the tire and delimiting a central portion and two shoulder portions, a plurality of laterally extending wide zig-zag grooves on each side of the equatorial plane each having two sets of legs, the first set having three legs, a first, a second, and third, the first set of legs extending across the shoulder portion and the second set having two legs, a fourth and a fifth, the second set of legs extending into the central portion, the center lines of said first and second sets of legs being circumferentially offset from each other at said straight circumferential groove by at most half the distance between the centerlines of adjacent laterally extending zig-zag grooves, wherein the centerline of each of the legs form an angle with respect to a plane parallel to the equatorial plane, the first leg's centerline forming an angle between 80° and 90°, the second leg's centerline forming an angle between 50° and 60°, the third leg's centerline forming an angle between 80° and 90°, the centerline of the fourth leg forming an angle between 80° and 90°, and the centerline of the fifth leg forming an angle between 45° and 55°, the centerline of the first leg, intersecting a tread edge, and the centerlines of the third and fourth legs, intersecting a circumferentially extending groove and wherein the lateral sides of the fifth leg of each said laterally extending wide zig-zag groove extend towards the equatorial plane via two circumferentially spaced narrow grooves which merge each into one of the two circumferentially spaced narrow grooves extending from the fifth leg of a laterally extending wide zig-zag groove situated on the opposite side of the equatorial plane, defining thereby rows of interpenetrating blocks.

2. A tire tread according to claim 1, wherein the laterally extending zig-zag grooves on opposite sides of the equatorial plane are inclined in opposite circumferential directions.

3. A tire tread according to claim 1, wherein said circumferentially extending straight grooves are spaced from the equatorial plane by a distance ranging between 16% and 24% of the tread width.

4. A tire tread according to claim 1, wherein the laterally extending zig-zag grooves each have a width ranging between 8% and 16% of the tread width.

5. A tire tread according to claim 1, wherein said narrow grooves have a width ranging between 2% and 5% of the tread width.

6. A tire thread according to claim 1, wherein the rows of interpenetrating blocks axially overlap in the ranges between 3% and 12% of the tread width.

7. A tire tread according to claim 1, wherein the laterally extending zig-zag grooves situated on opposite sides of the equatorial plane and interconnected by narrow grooves are circumferentially offset by 15% to 25% of the distance between the centerlines of adjacent but oppositely oriented laterally extending zig-zag grooves.

8. A tire tread according to claim 1, wherein each block includes at least one sipe therein extending in the block in a straight, curved or zig-zag manner.

9. A tire tread according to claim 8, wherein each block has one sipe therein, originating in a circumferentially extending straight groove, substantially halfway between the two edges of the block, following the path of the centerline of the block, without extending to the opposite peripheral edge of the block.

10. A tire tread according to claim 8, wherein the sipes have a variable depth ranging between 15% and 55% of the circumferentially extending grooves depth.

11. The tire of claim 1, wherein the distance between the first and second straight groove define a central portion of the tread having a ratio of land area to footprint area in the range between 50% and 70% while the remaining portion of the tread has a range of 40% to 60% of land area to footprint area.

12. The tire of claim 11 wherein the land to footprint ratio of the central portion is between 55% and 65%.

13. The tire of claim 12 wherein the land to footprint ratio of the remaining portion of the tread in the range of 45% to 55%.

* * * * *